(12) United States Patent
Sugata

(10) Patent No.: US 7,588,385 B2
(45) Date of Patent: Sep. 15, 2009

(54) COUPLING DEVICE AND IMAGE FORMING APPARATUS USING THE SAME

(75) Inventor: Hideaki Sugata, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 392 days.

(21) Appl. No.: 11/443,105

(22) Filed: May 31, 2006

(65) Prior Publication Data
US 2006/0268081 A1 Nov. 30, 2006

(30) Foreign Application Priority Data

| May 31, 2005 | (JP) | ............................. 2005-160006 |
| Jul. 8, 2005 | (JP) | ............................. 2005-200143 |

(51) Int. Cl.
*G03G 15/00* (2006.01)
(52) U.S. Cl. .................... 403/359.4; 399/167
(58) Field of Classification Search ................. 464/160, 464/182; 403/298, 359.1–359.6; 399/167
See application file for complete search history.

(56) References Cited

U.S. PATENT DOCUMENTS 5,503,494 A * 4/1996 Kamata et al. ........... 403/359.6
6,654,580 B2 * 11/2003 Yamaguchi et al. ......... 399/167
6,771,927 B2 * 8/2004 Bloemen et al.
2004/0151518 A1 * 8/2004 Mizoguchi .................. 399/167

FOREIGN PATENT DOCUMENTS

| JP | 2002-031153 | 1/2002 |
| JP | 2005-076873 | 3/2005 |

* cited by examiner

*Primary Examiner*—Greg Binda
(74) *Attorney, Agent, or Firm*—Oblon, Spivak, McClelland, Maier & Neustadt, P.C.

(57) ABSTRACT

An image forming apparatus includes a driving source, a rotary element and a coupling device. The coupling device includes an inner coupling having a cylindrical shape with a first rotation axis and a first group of claws arranged to be evenly spaced in a circumferential direction, and an outer coupling having a cylindrical shape with a second rotation axis and a second group of claws arranged to be evenly spaced in a circumference direction to alternately mesh with the first group of claws. At least one of the first and second groups of claws includes claws with pointed tips so as to effectively connect the inner coupling with the outer coupling.

18 Claims, 14 Drawing Sheets

MISALIGNMENT OF SHAFT CENTER 1Y, 1M, 1C, 1BK

COUPLING DEVICE AND IMAGE FORMING APPARATUS USING THE SAME

CROSS REFERENCE TO RELATED APPLICATIONS

This patent specification is based on Japanese patent application, No. JP2005-160006 filed on May 31, 2005 and JP2005-200143 filed on Jul. 8, 2005 in the Japanese Patent Office, the entire contents of which are incorporated by reference herein.

BACKGROUND

1. Field of Invention

Exemplary aspects of the present invention relate to an image forming apparatus, and more particularly to an image forming apparatus that includes a coupling device for effectively connecting a drive-side coupling and a driven-side coupling even if shaft centers of the drive-side coupling and the driven-side coupling are misaligned.

2. Discussion of the Background

A related art coupling device 500A illustrated in FIG. 1 includes a drive-side coupling 502A serving as a first coupling and a driven-side coupling 501A serving as a second coupling. The drive-side coupling 502A is disposed on a tip surface of a drive-side base 503A serving as a first base. A plurality of driving claws 504A serving as first claws (one drive claw is shown in FIG. 1) are integrally formed with the drive-side base 503A. The driven-side coupling 501A is disposed on a tip surface of a driven-side base 506A serving as a second base. A plurality of driven claws 507A serving as second claws are integrally formed with the driven-side base 506A. As shown in FIG. 1, in a state where the drive-side coupling 502A and the driven-side coupling 501A are connected, each of the driving claws 504A and the driven claws 507A are alternately positioned, meshing each driving claw 504A with each driven claw 507A. The drive-side coupling 502A is connected to a driving shaft 508A. As the driving shaft 508A is rotatively driven by a not-shown driving source, the drive-side coupling 502A rotates. Accordingly, the driving claws 504A and the driven claws 507A are pressed with one another, and the rotation of the drive-side coupling 502A is transmitted to the driven-side coupling 501A, rotating a driven shaft 509A which is secured to the driven-side coupling 501A, thereby rotatively driving a rotation element of a driven unit 510A (not shown).

The driven-side coupling 501A is detachably connected with respect to the drive-side coupling 502A in a shaft line direction Z1 of the drive-side coupling 502A. By moving the driven-side coupling 501A together with the driven unit 510A in an arrow A-direction, the driven-side coupling 501A may be disengaged from the drive-side coupling 502A. On the other hand, by pressing the driven-side coupling 501A together with the driven unit 510A in an arrow B-direction, the driven-side coupling 501A and the drive-side coupling 502A are connected.

The drive-side coupling 502A is connected such that it is movable for a specific number of strokes in a shaft line direction Z1 with respect to the driving shaft 508A. Furthermore, a compression spring 512A is disposed between a spring receiving part 511A secured to the driving shaft 508A and the drive-side coupling 502A.

In a case where top faces 513A of the driven claws 507A collide with top faces 514A of the driving claws 504A when the driven-side coupling 501A is pressed in the arrow B-direction, the drive-side coupling 502A is pressed by the driven-side coupling 501A. Consequently, the drive-side coupling 502A moves in the arrow B-direction with respect to the driving shaft 508A, and the compression spring 512A is compressed. In this state, when the drive-side coupling 502A rotates, the driving claws 504A rotate with respect to the driven claws 507A, and due to the pressure effect of the compression spring 512A, the drive-side coupling 502A moves in the arrow A direction. As a result, each of the driving claws 504A advances between each of the driven claws 507A so that each of the driving claws 504A and each of the driven claws 507A are alternately positioned in a peripheral direction of the coupling device 500A. Accordingly, each of the driving claws 504A and each of the driven claws 507A are engaged, and the rotation of the drive-side coupling 502A is transmitted to the driven-side coupling 501A.

As described above, even if the top faces 513A of the driven claws 507A collide with the top faces 514A of the driving claws 504A when the driven-side coupling 501A and the drive-side coupling 502A are connected, the driven claws 507A and the driving claws 504A may be engaged by the rotation of the drive-side coupling 502A.

However, in the above-described coupling device 500A, the compression spring 512A is needed so that the driven claws 507A and the driving claws 504A are engaged even if the top faces 513A of the driven claws 507A collide with the top faces 514A of the driving claws 504A. Consequently, it results in a growing number of parts to be used for the coupling device 500A. Moreover, a space in which the compression spring 512A is disposed is needed, thereby increasing the size of an entire coupling device 500A.

In view of this, Japanese Laid-Open Patent Application 2005-76873, for example, proposes a coupling device in an effort to address this problem. FIG. 2 is a schematic diagram of the coupling device 500B proposed in Japanese Laid-Open Patent Application 2005-76873. FIG. 3 is a perspective view of the coupling device 500B. As shown in FIG. 2, the coupling device 500B includes a drive-side coupling 502B and a driven-side coupling 505B. The drive-side coupling 502B includes a cylindrical drive-side base 503B which is secured to a driving shaft 508B. A plurality of driving claws 504B are disposed on an outer peripheral surface of the drive-side coupling 502B. The driven-side coupling 505B includes a cylindrical driven-side base 506B, which is secured to a driven shaft 509B. A plurality of driven claws 507B are disposed on an inner peripheral surface of the driven-side base 506B. As shown in FIG. 3, on a tip portion of each of the driving claws 504B are formed slant faces 536B. Tips 538B of each of the driving claws 504B are linearly extended along a normal line from the drive-side base 504B. On a tip portion of each driven claws 507B are formed the slant faces 536B slanted in the same direction when facing each driving claw 504B. Accordingly, tips 535B of each of the driven claws 507B are linearly extended from the driven-side base 506B to a shaft center.

In a case where the driven claws 507B and the driving claws 504B come into contact when the driven-side coupling 505B is connected to the drive-side coupling 502B, the slant faces 535B of the driven claws 507B come into contact with the slant faces 536B of the driving claws 504B. When the slant plates 535B of the driven claws 507B and the slant faces 536B of the driving claws 504B come into contact, pressure force in which the driven-side coupling 505B is pressed in the shaft direction is dispersed to the rotation direction and the shaft direction. Consequently, if the driven-side coupling 505B continues to be pressed in the shaft direction, the slant faces 535B of the driven claws 507B and the slant faces 536B of the driving claws 504B slide along one another, rotating either one of the driven-side coupling 505B or the drive-side coupling 502B. As a result, each of the driven claws 507B advances between each of the driving claws 504B so that each of the driving claws 504B and each of the driven claws 507B are engaged.

In the coupling device 500B proposed in Japanese Laid-Open Patent Application 2005-76873, without the compression spring 512A, the driven claws 507B and the driving claws 504B may be engaged, even if the driven claws 507B and the driving claws 504B come into contact when the driven-side coupling 505B is connected to the drive-side coupling 502B. As a result, a number of parts and the size of the apparatus may be reduced.

FIG. 4 illustrates the way a driven unit 510B, including the driven-side coupling 505B of the coupling device 500B, is attached to a rear plate 516B. As illustrated in FIG. 4, a hole 517B through which a shaft 511B of the driven-side unit 510B is inserted is provided on the rear plate 516B. When the driven unit 510B is mounted in the apparatus main body, the driven unit 510B is shifted in the shaft direction so as to insert the shaft 511B into the hole 517B and determine the position of the driven unit 510B. Subsequently, the driven-side coupling 505B and the drive-side coupling 502B are connected. In a case where the driven-side coupling 505B and the drive-side coupling 502B are connected after the position of the driven unit 510B is determined, there is a possibility that the shaft center of the drive-side coupling 502B and the shaft center of driven-side coupling 502B are misaligned. That is, because the position of the driven unit 510B is determined in advance, parts accuracy, accumulation of dimensional tolerance of the hole 517B or the like, and deflection due to unit stiffness may cause misalignment of the shaft centers.

FIG. 5 illustrates the driven-side coupling 505B seen from an E-direction of FIG. 2, and a dash-double dotted line in FIG. 5 indicates the drive-side coupling 502B. As illustrated in FIG. 5, in a case where the shaft centers of the drive-side coupling 502B and the driven-side coupling 505B correspond, the linear tips 538B of the driving claws 504B are parallel with the linear tips 540B of the driven claws 507B. As illustrated in FIG. 5, in a case where the linear tips 538B of the driving claws 504B are parallel with the linear tips 540B of the driven claws 507B, the driven-side coupling 505B is connected to the drive-side coupling 502B without the linear tips 538B of the driving claws 504B hitting the linear tips 540B of the driven claws 507B.

On the other hand, as shown in FIG. 6, in a case where the shaft centers of the drive-side coupling 502B and the driven-side coupling 505B are misaligned, as marked by the line X in FIG. 6, the linear tips 538B of the driving claws 504B and the linear tips 540B of the driven claws 507B will cross. In other words, because both tips of the driving claws and the driven claws are linear, when the shaft centers are misaligned, the angle of the tips 538B of the driving claws 504B and the angle of the tips 540B of the driven claws 507B will not correspond, thereby making the tips 538B of the driving claws 504B and the tips 540B of the driven claws 507B crossed. Accordingly, when the driven-side coupling 504B is connected to the drive-side coupling 502B while the shaft centers of the drive-side coupling 502B and the driven-side coupling 505B are misaligned, the linear tips 540B of the driven claws 507B will collide with the linear tips 538B of the driving claws 504B, and the driven-side coupling 505B may not be moved to the drive-side coupling. As a result, there is a problem that the driven-side coupling 505B and the drive-side coupling 502B may not be connected. In addition, when forcibly trying to connect the driven-side coupling 505B and the drive-side coupling 502B while the driving claws and the driven claws are collided, this may cause a distortion or damage to the tips of claws or the driven-unit 510B.

SUMMARY

In view of the foregoing, an exemplary embodiment of the present invention provides an image forming apparatus which includes a driving source, a rotary element and a coupling device configured to connect the driving source with the rotary element.

An exemplary embodiment of a coupling device may include an inner coupling having a first rotating shaft and a first group of claws arranged in a circumferential direction with even space therebetween, and an outer coupling having a second rotating shaft and a second group of claws arranged in a circumferential direction with even space therebetween. The coupling device is configured to alternately mesh with the first group of claws in the circumferential direction when the outer coupling is moved towards the inner coupling along in an axial direction, such that the second group of claws face the first group of claws and the second axis of the outer coupling is approximately in line with the first axis of the inner couplings. At least one of the first and second groups of claws includes claws having a pointed top.

An exemplary embodiment of the coupling device may further include the inner coupling including a first base mounted to one end portion of the first shaft, and on which the first group of claws are disposed in the circumferential direction.

An exemplary embodiment of the coupling device may further include the outer coupling including a second base mounted to one end portion of the second shaft, and on which the second group of claws are disposed in the circumferential direction.

In one exemplary embodiment of the image forming apparatus, one of the inner and outer couplings is connected to the driving source and another one of the inner and outer couplings is connected to the rotary element to be driven by power of the driving source through the inner and outer couplings.

In one exemplary embodiment of the image forming apparatus, one of the first and second groups of claws includes slant-top-surface claws having a slant top surface which faces the pointed claws. The pointed claws slide along the slant top surface of the slant-top-surface claws when the pointed claws collide with the slant-top-surface claws. The outer coupling is further moved towards the inner coupling along in the axial direction so that one of the inner and outer couplings is rotated until the first and second groups of claws are engaged with each other.

In one exemplary embodiment, a coupling device may include an inner coupling having a first rotating shaft and a first group of claws arranged in a circumferential direction with even space therebetween. The outer coupling may have a second rotating shaft and a second group of claws arranged in a circumferential direction with even space therebetween and configured to alternately mesh with the first group of claws in the circumferential direction when the outer coupling is moved towards the inner coupling along an axial direction such that the second group of claws faces the first group of claws and that the second axis of the outer coupling is approximately in line with the first axis of the inner couplings. At least one of the first and second groups of claws may include claws having a pointed top.

An exemplary embodiment of the coupling device may include the inner coupling including a first base having a cylindrical shape mounted to one end portion of the first rotating shaft, and on which the first group of claws are disposed in the circumferential direction.

An exemplary embodiment of the coupling device may include the outer coupling including a second base having a cylindrical shape mounted to one end portion of the second rotating shaft, and on which the second group of claws are disposed in the circumferential direction.

In one exemplary embodiment of the coupling device, one of the inner and outer couplings is connected to a driving source and another one of the inner and outer couplings is connected to a rotary element to be driven by power of the driving source through the inner and outer couplings.

In one exemplary embodiment of the coupling device, at least one of the first and second groups of claws includes semispherical tips thereof.

In one exemplary embodiment of the coupling device, at least one of the first and second groups of claws includes conical tips thereof.

In one exemplary embodiment of the coupling device, one of the first and second groups of claws includes slant-top-surface claws having a slant top surface which faces the pointed claws, and the pointed claws slide along the slant top surface of the slant-top-surface claws when the pointed claws collide with the slant-top-surface claws and the outer coupling is further moved towards the inner coupling along in the axial direction so that one of the inner and outer couplings is rotated until the first and second groups of claws are engaged with each other.

In one exemplary embodiment of the coupling device the pointed claws are arranged at positions different in the axial direction and the slant-top-surface claws are correspondingly arranged at positions in the axial direction so that collisions of facing pairs of the pointed claws and the slant-top-surface claws sequentially occur.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
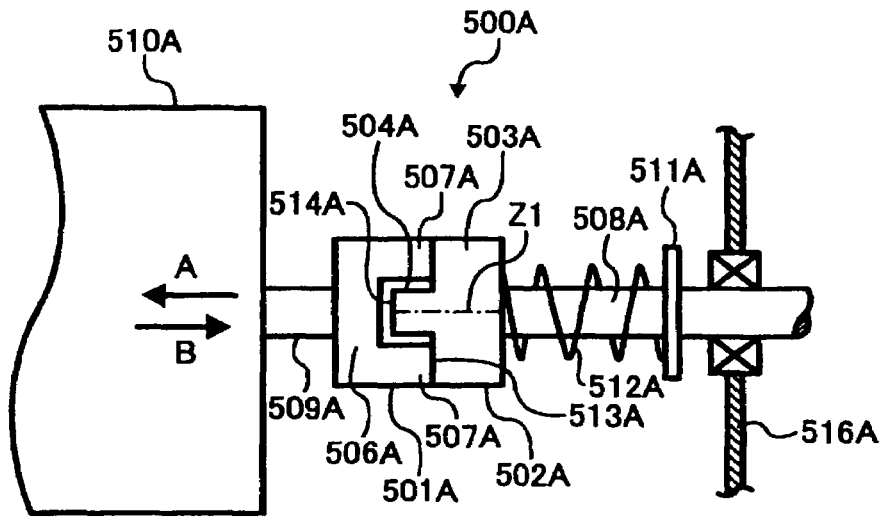
FIG. 1 is a schematic diagram of one example of a related art coupling device.
Figure 2:
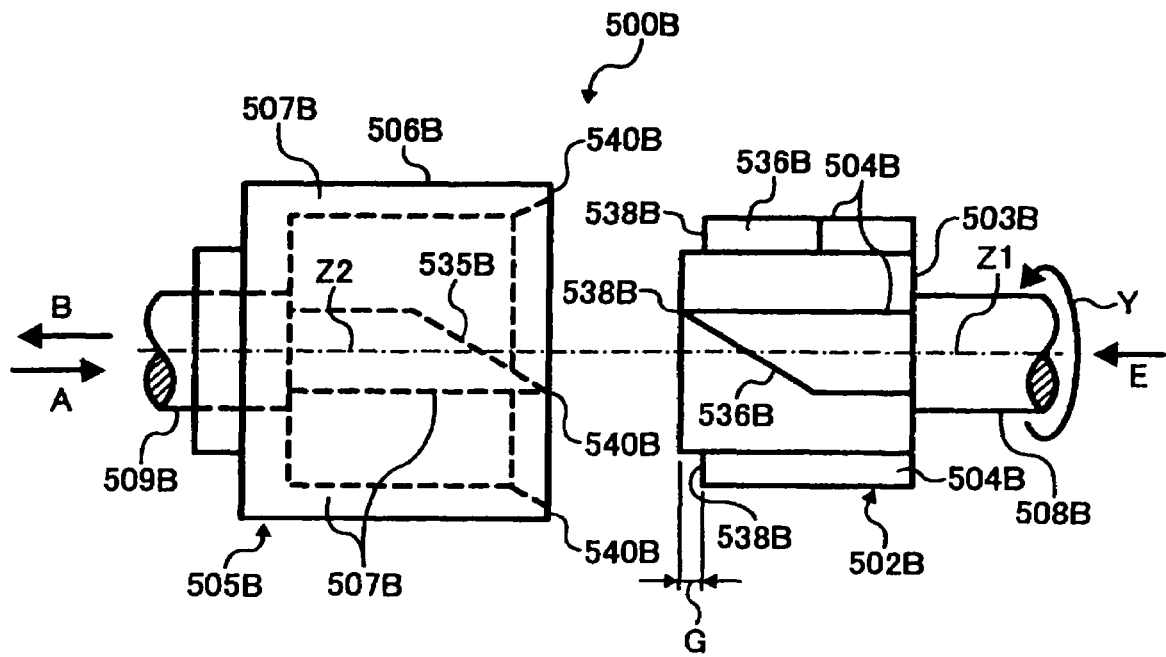
FIG. 2 is a schematic diagram of another related art coupling device.
Figure 3:
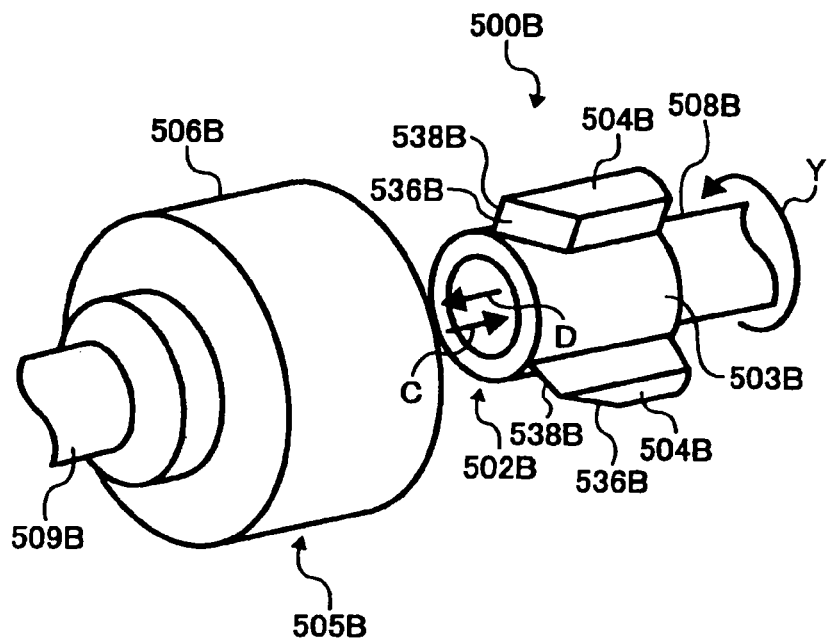
FIG. 3 is a perspective view of the related art coupling device of FIG. 2.
Figure 4:
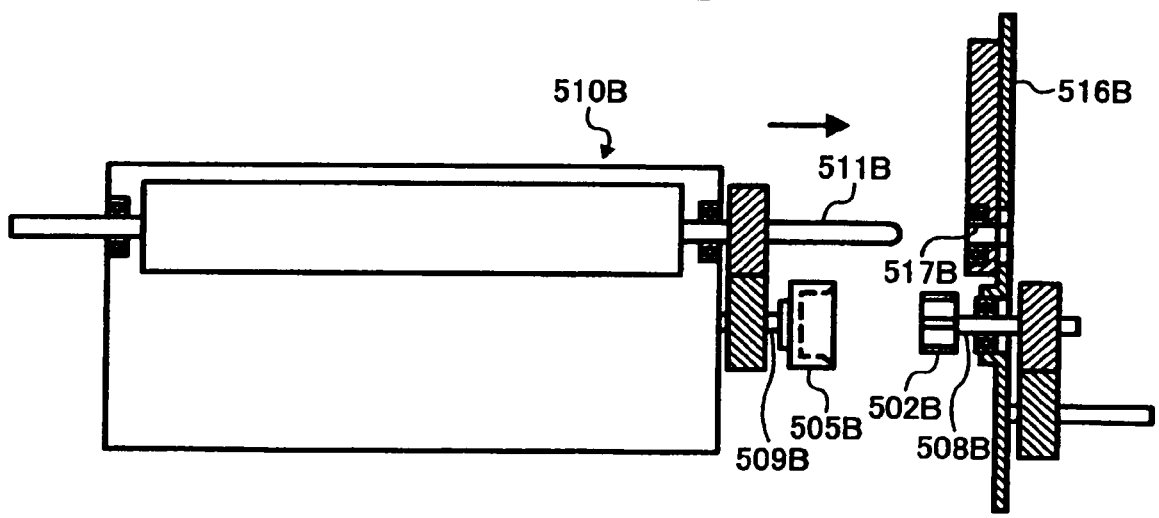
FIG. 4 is a schematic diagram of an example use of a related art driven unit.
Figure 5:
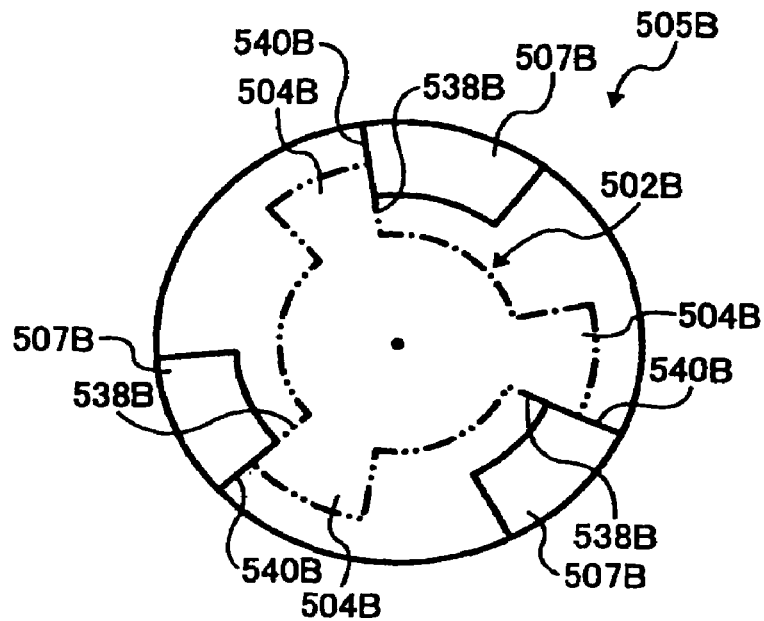
FIG. 5 is a schematic diagram illustrating the related art coupling device of FIG. 2 in which a drive-side and a driven-side couplings are engaged with each other when their shaft centers correspond.
Figure 6:
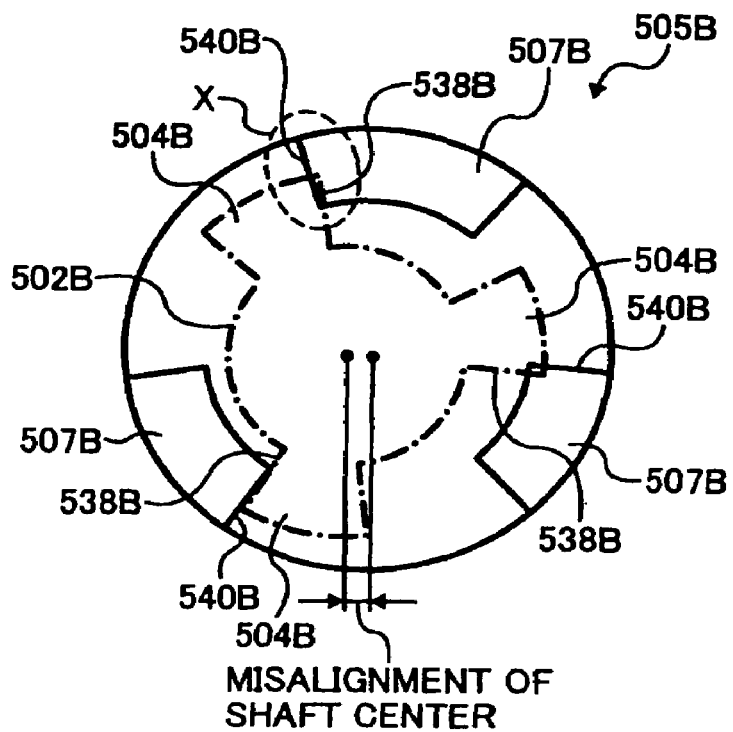
FIG. 6 is a schematic diagram illustrating the related art coupling device of FIG. 2 in which the drive-side and the driven-side couplings are engaged with each other when their shaft centers are misaligned.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 7, a color laser printer according to an exemplary embodiment of the present invention is described.

A description will now be given of one exemplary embodiment of the present invention, which is applied to an electrophotographic-type tandem color laser printer (hereinafter referred to as printer) serving as an example of an image forming apparatus.

Figure 7:
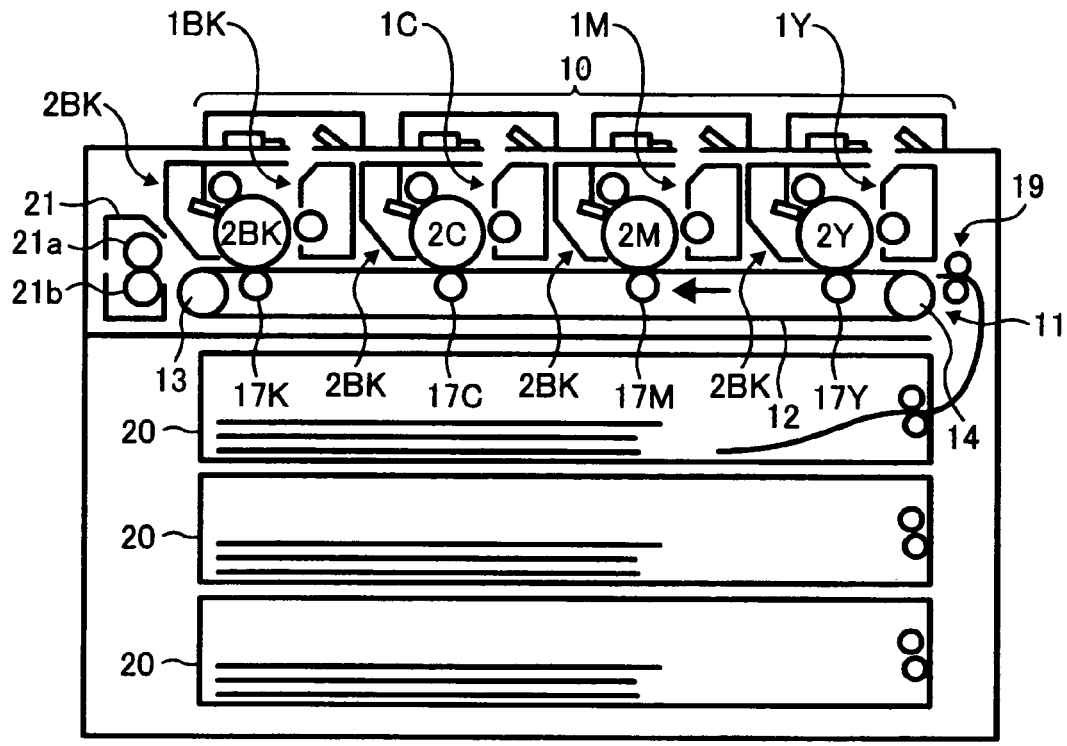
FIG. 7 is a schematic diagram of a laser printer according to one exemplary embodiment of the present invention.

As illustrated in FIG. 7, the laser printer includes four process units 1Y, M, C and BK for creating color images of yellow (Y), magenta (M), cyan (C) and black (BK), respectively. Thereafter, letters Y, M, C and BK noted after reference numerals indicate respective colors. In addition to the process units 1Y, 1M, 1C and 1K, an optical writing unit 10, a transfer unit 11, a pair of resist rollers 19, three sheet feeding cassettes 20, a fixing unit 21 and so forth are arranged in the laser printer.

The optical writing unit 10 includes four optical writing devices. Each optical writing device includes a light source, a polygon mirror, an f-θ lens and a reflective mirror, and so forth. Based on image data, a laser beam is emitted onto a later-described photoreceptor surface.

Figure 8:
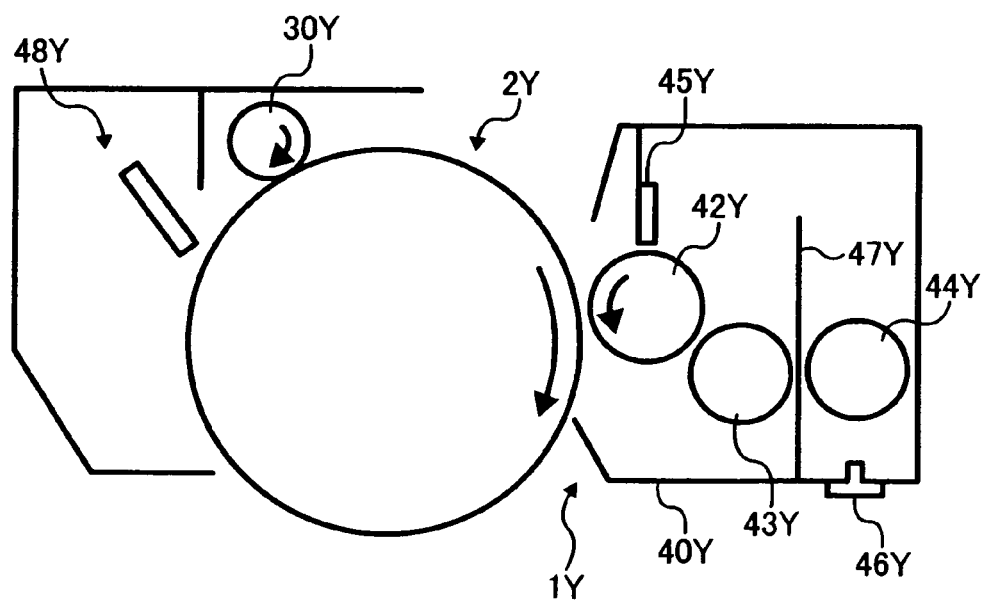
FIG. 8 is an enlarged view of a process unit for a color of yellow utilized in the laser printer of FIG. 7.

FIG. 8 is an enlarged view of a general structure of a process unit 1Y for a color yellow among the process units 1Y, M, C and BK. It should be noted that since the structure is the same for other process units 1M, C and BK, a description for the process units 1M, C and BK is omitted. The process unit 1Y of FIG. 8 includes a drum-shaped photoreceptor 2Y, a charging device 30Y, a developing apparatus 40Y, a drum cleaning apparatus 48Y and so forth.

The charging device 30Y uniformly charges the drum surface by causing a charging roller, to which alternating current voltage is applied, to rub against the photoreceptor 2Y. The surface of the photoreceptor 2Y, to which a charging process has been performed, is scanned and irradiated by a laser beam which has been modulated and deflected by the optical writing unit 10. Subsequently, an electrostatic latent image is formed on the drum surface. Then, the formed electrostatic latent image is developed by the developing apparatus 40Y and becomes a Y toner image.

The developing apparatus 40Y includes a developing roller 42Y disposed such that a portion thereof is exposed from an opening of a casing. The developing apparatus 40Y also includes a primary conveyance screw 43Y, a secondary conveyance screw 44Y, a doctor blade 45Y, a toner density sensor (hereinafter referred to as T sensor) 46Y and so forth.

In the casing, a dual-component developer including magnetic carrier particles and a Y toner for negative charging is stored. The dual-component developer is conveyed by the primary conveyance screw 43Y and the secondary conveyance screw 44Y, while being agitated and triboelectrically charged. Subsequently, the dual-component developer is carried onto the developing roller 42Y. Then, the dual-component developer is conveyed to a developing area facing the photoreceptor 2Y after the thickness of a layer of the developer is regulated by the doctor blade 45Y, and the Y toner is adhered to the electrostatic latent image on the photoreceptor 2Y in the developing area, thereby forming a Y toner image on the photoreceptor 2Y. The dual-component developer from which the Y toner is consumed during the developing process is recovered to the casing along a rotating motion of the developing roller 42Y.

A partition 47Y is provided between the primary screw 43Y and the secondary screw 44Y. By the partition 47Y, a primary supply part for storing the developing roller 42Y, the primary conveyance screw 43Y and so forth, and a secondary supply part are separated in the casing. The primary conveyance screw 43Y is rotatively driven by a not-shown driving mechanism to supply the dual-component developer in the primary supply part to the developing roller 42Y, conveying the developer from the front shown in FIG. 8 to the back. The dual-component developer conveyed near the end portion of the primary supply part advances to the secondary supply part through a not-shown opening part provided in the partition 47Y. In the secondary supply part, the secondary conveyance screw 44Y is rotatively driven by a not-shown driving mechanism to convey the dual-component developer, which is transferred from the primary supply part in a direction opposite to the primary conveyance screw 43Y. The dual-component developer, which is conveyed near the end of the secondary supply part by the secondary conveyance screw 44Y, is recovered to the primary supply part through another not-shown opening part provided in the partition 47Y.

The toner density sensor (T sensor) 46Y formed of a magnetic sensor which measures magnetic permeability is provided in the bottom wall near the center of the secondary supply part, and outputs a voltage corresponding to the magnetic permeability of the dual-component developer which passes above the T sensor 46Y. In other words, the T sensor 46Y outputs the voltage corresponding to the density of the Y toner so as to indicate a certain correlation between the magnetic permeability of the dual-component developer and the toner density. The value of the output voltage is sent to a not-shown control unit. The control unit includes a RAM which stores a Vtref for yellow which is a target value of the output voltage from the T sensor 46Y. In addition, the RAM stores data of a Vtref for magenta, a Vtref for cyan and a Vtref for black which are also target values of the output voltage from the not-shown T sensors mounted in other developing apparatus. The Vtref for yellow is used for drive control of a not-shown Y toner conveyance apparatus. In particular, the control unit drives and controls the not-shown Y toner conveyance apparatus to supply the Y toner to the secondary supply part 49Y, such that the value of the output voltage from the T sensor 46Y is brought closer to the Vtref for yellow. By this toner supply process, the toner density of the Y toner of the dual-component developer in the developing apparatus 40Y is maintained within a predetermined range. The similar toner supply control is performed for developing apparatus of other process units.

The Y toner image formed on the photoreceptor 2Y for yellow is transferred onto transfer paper which is conveyed to a later-described paper conveying belt. After the transfer, transfer residual toner is removed from the surface of the photoreceptor 2Y by the drum cleaning apparatus 48Y, and thereafter the surface of the photoreceptor 2Y is discharged by a not-shown discharging device. Subsequently, the surface of the photoreceptor 2Y is uniformly charged by the charging device 30Y to prepare for a subsequent image forming process. The same process applies to other process units. Each of the process units 1Y, M, C and BK is removable with respect to the printer main body, and can be replaced when the product life is reached.

As shown in FIG. 7, the transfer unit 11 includes a paper conveying belt 12, a driving roller 13, a pulley 14, four transfer bias rollers 17Y, M, C and BK, and so forth. The paper conveying belt 12 is tightly stretched by the driving roller 13 and the pulley 14 and endlessly moved counterclockwise in FIG. 7, by the driving roller 13 rotated by a not-shown driving system. Transfer bias is applied to the four transfer bias rollers 17Y, M, C and BK from a not-shown power source. Then, the paper conveying belt 12 is pressed from the backside thereof against the photoreceptors 2Y, M, C and BK to form transfer nips, respectively. In each transfer nip, due to the transfer bias effect, a transfer electric field is formed between the photoreceptor and the transfer bias roller. The Y toner image formed on the photoreceptor 2Y for yellow is transferred onto the transfer paper P that is conveyed on the paper conveying belt 12 due to the transfer electric field and the nip pressure. On the Y toner image, the toner images for M, C and BK formed on the photoreceptors 2M, C and BK are sequentially transferred, overlapping one another. By the overlap transfer process, a full-color toner image as opposed to a white color of the paper is formed on the transfer paper P that is conveyed on the paper conveying belt 12.

At the bottom of the transfer unit 11, three sheet feeding cassettes which store a plurality of transfer paper P in piles are stacked, and in each cassette, the transfer paper P on the top of the pile is pressed against the paper supply roller. When the paper supply roller is rotatably driven at a predetermined timing, the transfer paper P on the top of the pile is supplied to a paper conveying path.

Next, a description will be given of a pair of resist rollers. The transfer paper P supplied to the paper conveying path from the sheet feeding cassette 20 is conveyed between a pair of resist rollers 19. The pair of resist rollers 19 transfer, at a timing in which the toner images can be overlapped in each nip, the transfer paper P conveyed between the rollers. Accordingly, toner images are transferred onto the transfer paper P in each transfer nip, overlapping one another.

The fixing unit 21 includes a heating roller 21a having a heat source, such as a halogen lamp and the like inside, and a pressure roller 21b which is pressure-welded with the heating roller 21a, so as to form a fixing nip. The full-color image is fixed on the surface of the transfer paper P, while the transfer paper P is conveyed in the fixing nip. The transfer paper P, which has passed the fixing unit 21, is ejected outside the printer through a pair of not-shown paper ejecting rollers.

Figure 10:
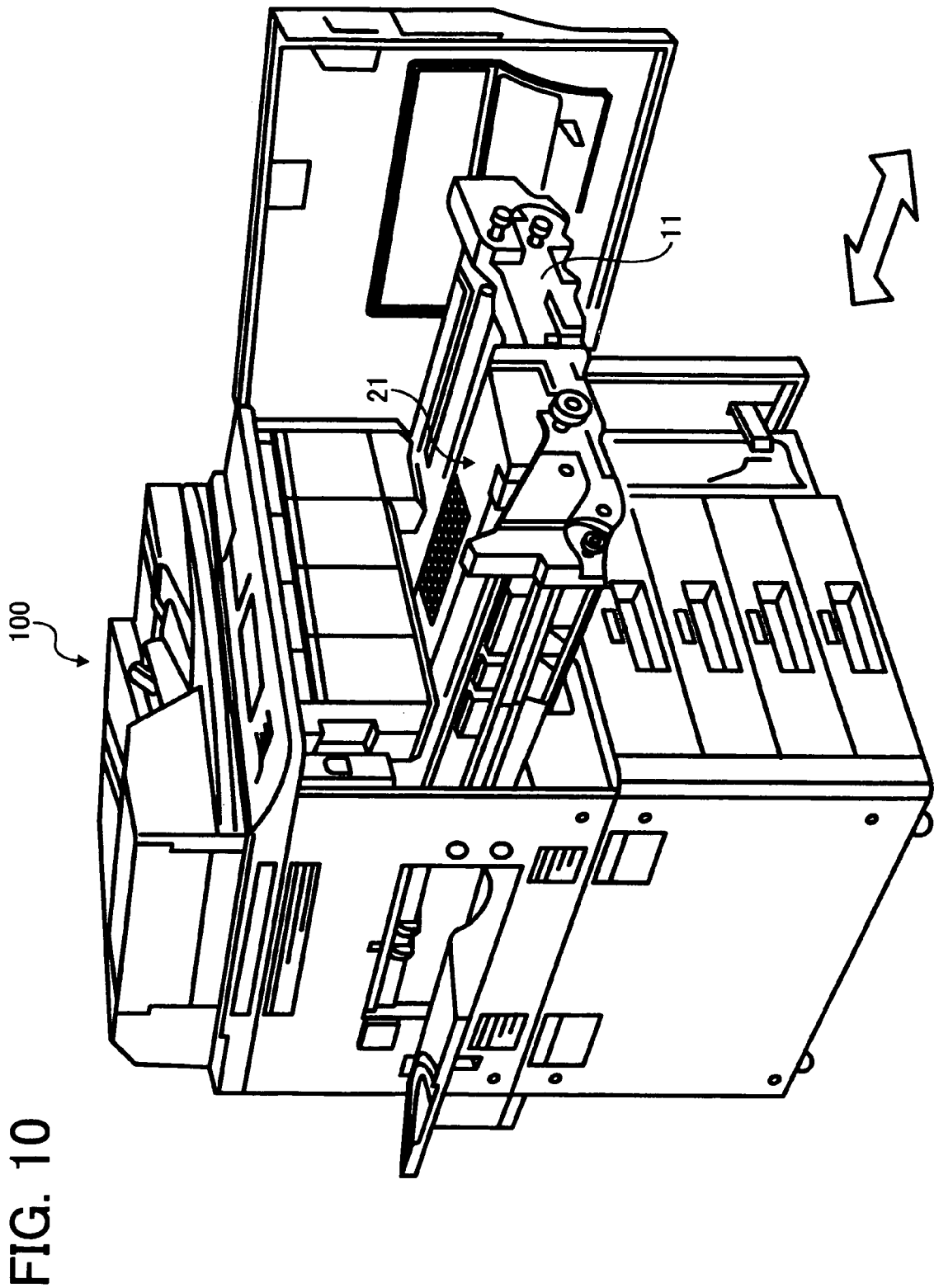
FIG. 10 is a schematic diagram illustrating a manner in which a fixing unit and a transfer unit are pulled out of the laser printer of FIG. 7.

In an exemplary embodiment of the present invention, as shown in FIG. 10, the fixing unit 21 and the transfer unit 11 can be pulled out from the printer main body by a pull-out mechanism in the printer main body. The fixing unit 21 or the transfer unit 11 are pulled out from the inside of the printer main body and detached from the printer main body.

Figure 11:
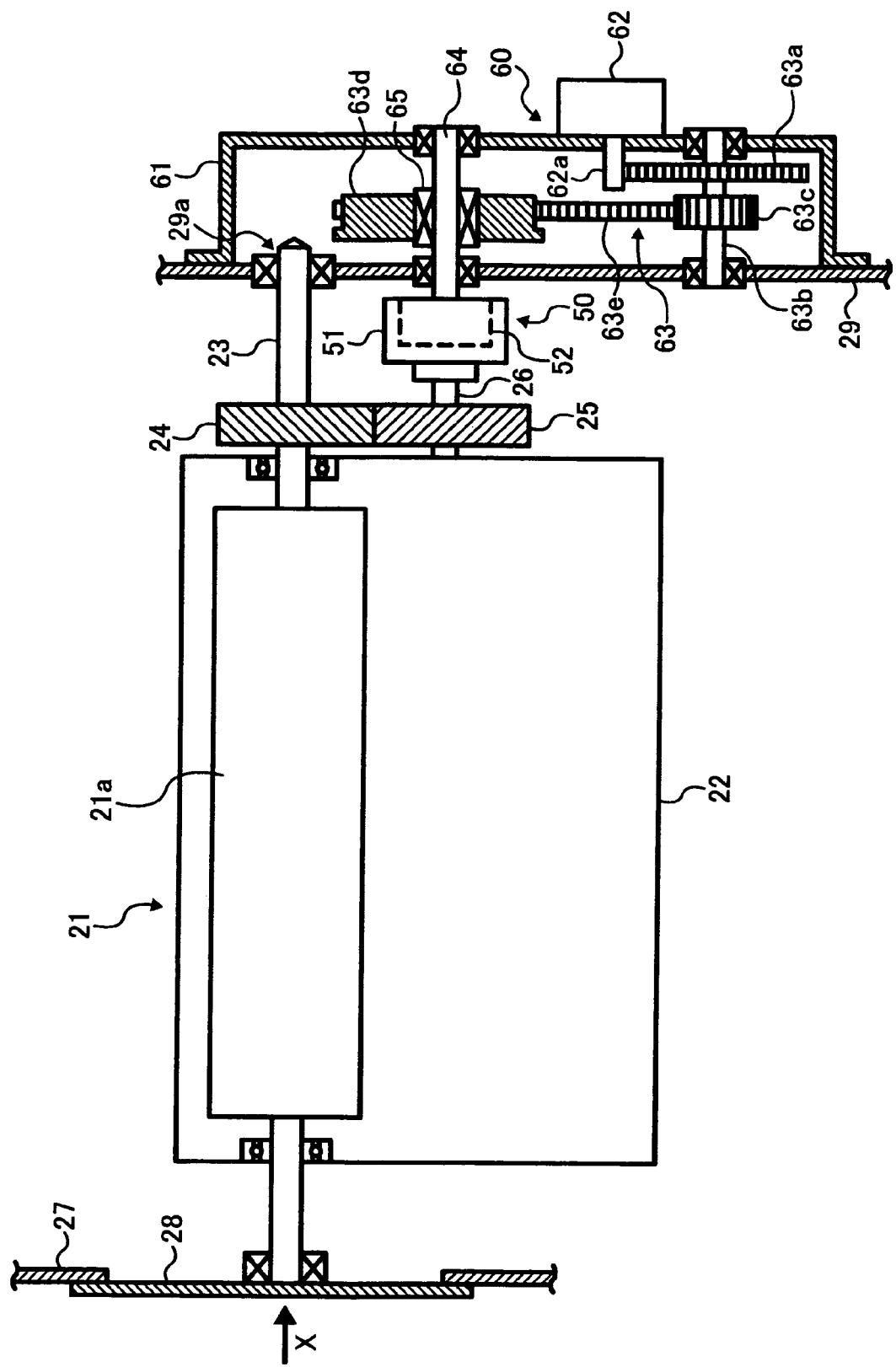
FIG. 11 is a cross sectional view of a drive-connecting section of the fixing unit of FIG. 10.

Next, a description will be given of a distinguishing structure of the laser printer of the exemplary embodiment. FIG. 11 is a cross sectional view of a drive connecting portion of the fixing unit 21 serving as a driven unit. The fixing unit 21 of FIG. 11 includes a case 22, the fixing roller 21a disposed inside the case 22 and the not-shown pressure roller 21b, which is pressure-welded with the fixing roller 21a, and rotatably driven in conjunction with the fixing roller 21a. A roller gear 24 is fixed to a shaft 23 of the fixing roller 21, and a coupling gear 25, which is fixed to a driven shaft 26 rotatably secured on the side of the case 22, is meshed with the roller gear 24. At the tip of the driven shaft 26, a driven-side coupling 51 serving as a second coupling of a coupling device 50 is concentrically fixed. Furthermore, one end of the shaft 23 of the fixing roller 21 is rotatively secured on a faceplate 28, which is detachably attached to a front-side panel 27 of the printer main body. The other end of the shaft 23 is rotatively supported in a hole 29a on the rear plate 29.

The driving apparatus 60, serving as a driving unit, is fixed to the rear plate 29 of the image forming apparatus main body and includes a support panel 61, a drive motor 62 serving as a drive source, a transmission mechanical section 63 and a driving shaft 64. The drive motor 62 is fixed to the support panel 61. The transmission mechanical section 63 includes a driving gear 63a, a driving pulley 63c, a driven pulley 63d and a timing belt 63e. The driving gear 63a is fixed to a rotating shaft 63b, which is rotatively supported by the support panel 61 and the rear plate 29, and is meshed with an output gear 62a extending from the drive motor 62. The driving pulley 63c is fixed to the rotating shaft 63b, and the timing belt 63e is tightly stretched between the driving pulley 63c and the driven pulley 63d. The driven pulley 63d is fixed to the driving shaft 64 which is rotatively supported by the support panel 61 and the rear plate 29. Rotation of the drive motor 62 is transmitted to the driving shaft 64 through the output gear 62a, the driving gear 63a, the rotating shaft 63b, the driving pulley 63c, the timing belt 63e and the driven pulley 63d. Furthermore, on the end portion of the driving shaft 64 at the fixing roller side, a drive-side coupling 52 serving as a first coupling of a coupling is concentrically fixed.

As shown in FIG. 11, in a state where the fixing unit 21 is mounted in the printer main body, the drive-side coupling 52 is inserted into the driven-side coupling 51. The drive-side coupling 52 is engaged with the driven-side coupling 51 in a rotation direction. Accordingly, the rotation of the driving shaft 64 is transmitted to the driven shaft 26 through the coupling device 50, and the fixing roller 21a is rotatively driven. Then, the rotation of the fixing roller 21a is transmitted to the pressure roller 21b through a not-shown transmission apparatus, and the pressure roller 21b is rotated.

Figure 12:
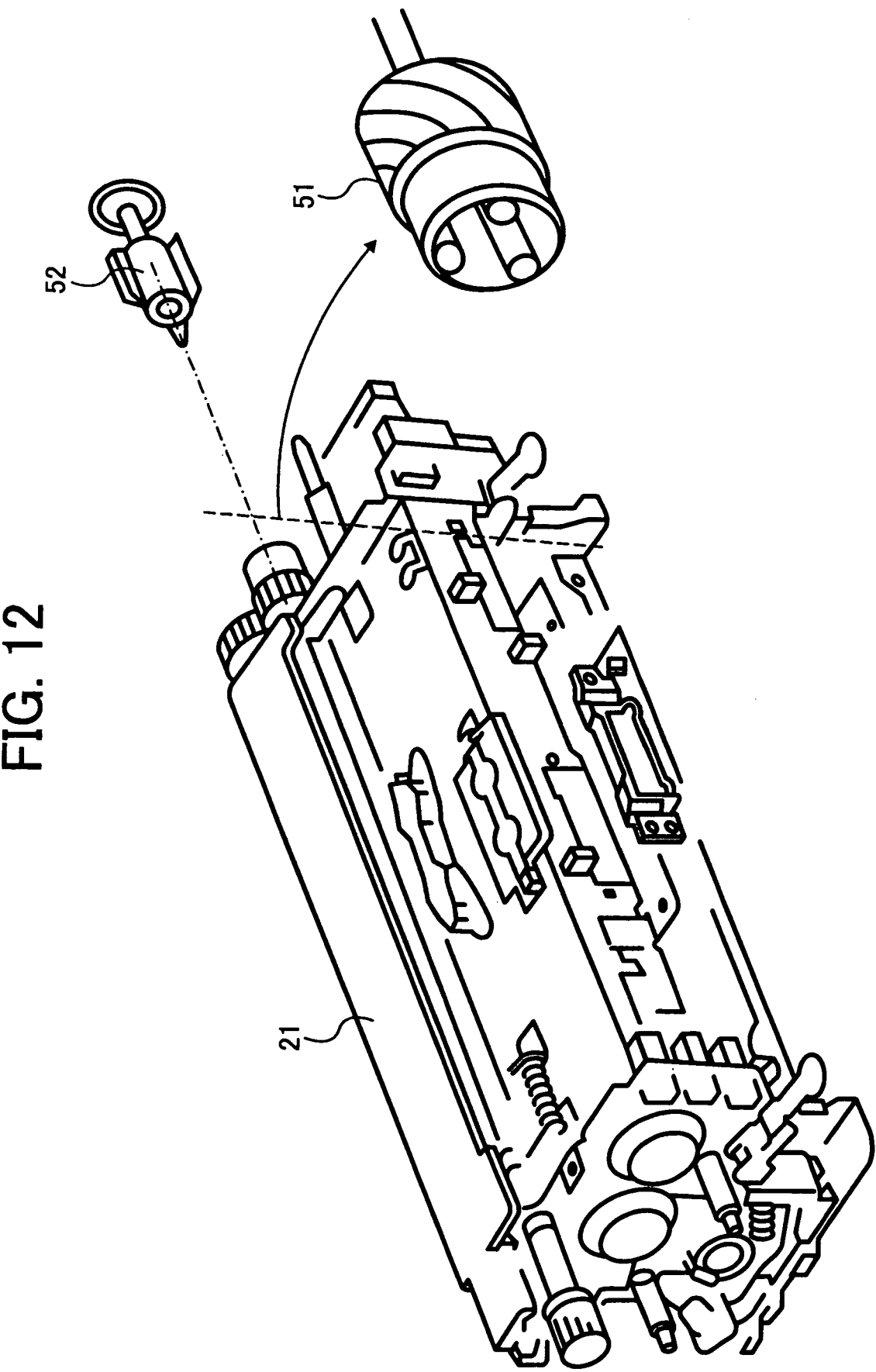
FIG. 12 is a schematic diagram illustrating a manner in which a driven-side coupling attached to a tip of a driven shaft of the fixing unit of FIG. 10 is connected to a drive-side coupling provided in the laser printer of FIG. 7.

The driven-side coupling 51 provided at the tip of the driven shaft 26 of the fixing unit 21 is connected to the drive-side coupling 52 provided at the end of the driving shaft 64 of the driving apparatus 60, when the fixing unit 21 is pulled into the apparatus main body as shown in FIG. 12.

Figure 13:
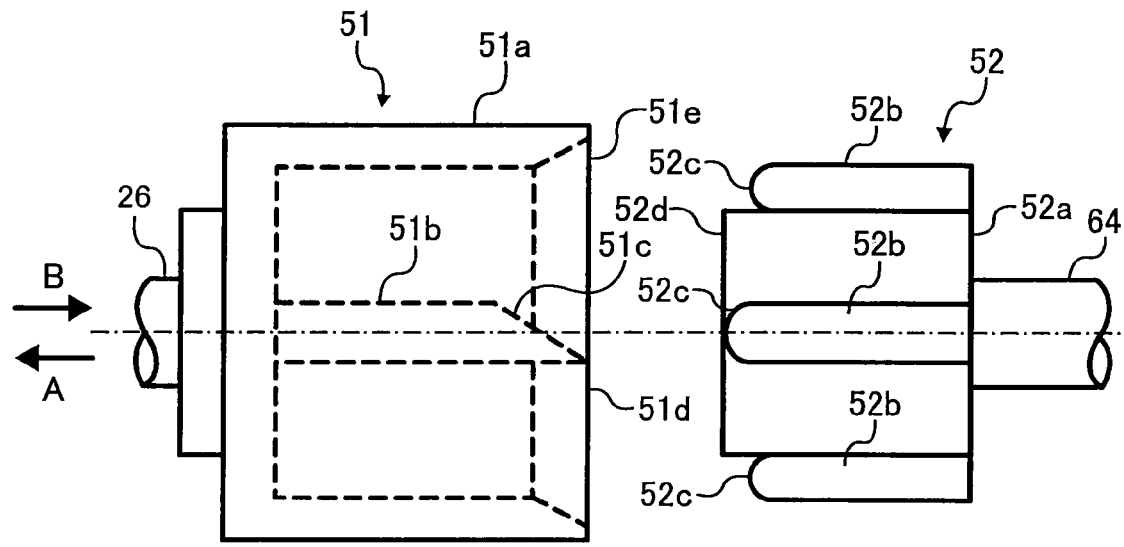
FIG. 13 is a schematic diagram of a coupling device according to one exemplary embodiment of the present invention, including the drive-side and the driven-side couplings of FIG. 12.
Figure 14:
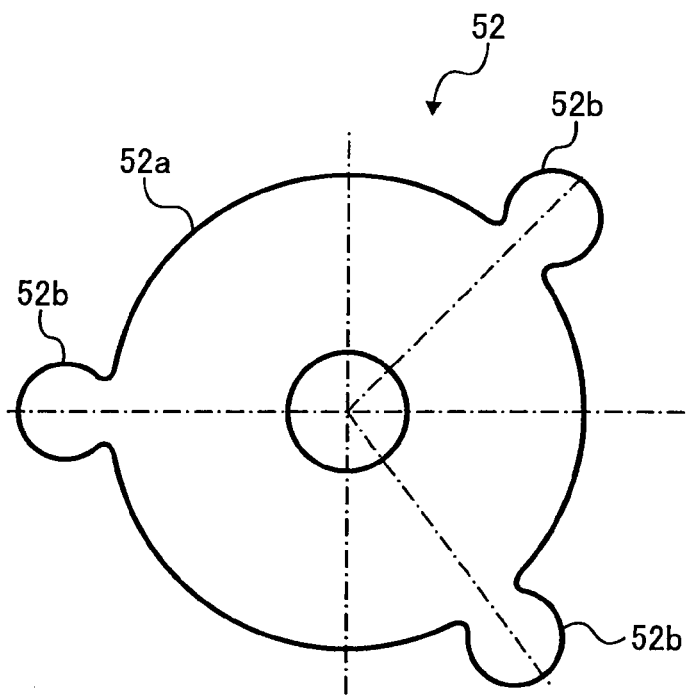
FIG. 14 is a front view of the drive-side coupling of the coupling device of FIG. 13.

Next, a description will be given of the coupling device 50. FIG. 13 is a plan view illustrating the coupling device 50 when the driven-side coupling device 51 is separated from the drive-side coupling 52. The drive-side coupling 52 includes a drive-side base 52a serving as a first base formed in a cylindrical shape, and a plurality of driving claws 52b serving as first claws, which are aligned on a peripheral surface of the drive-side base 52a and integrally formed therewith. Three driving claws 52b are provided, as shown in FIG. 14, and disposed at each of three positions of an evenly divided circumference of the drive-side base 52a, respectively. The tip portion of the driving claws 52b is in a semispherical shape, and tips 52c of the driving claws 52b are pointed. Furthermore, the tip 52c of one of the plurality of the driving claws 52b of the drive-side coupling 52 is disposed at a position more adjacent to the tips 52d of the drive-side base 52a than the tips 52c of other driving claws 52b.

Figure 15:
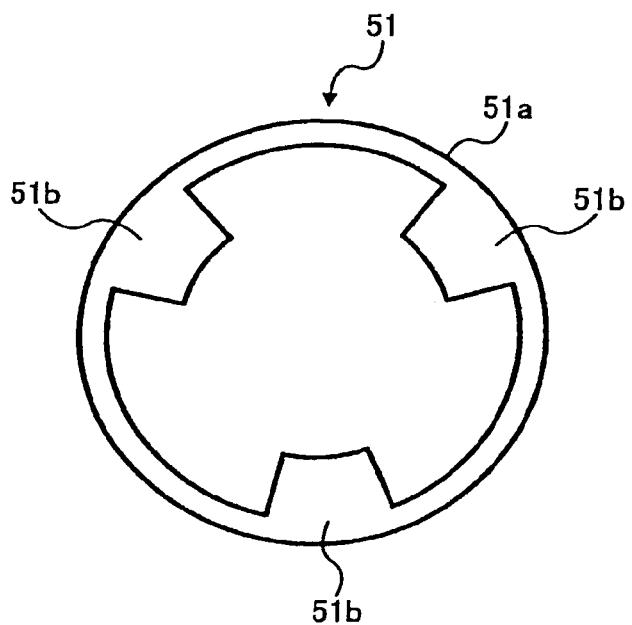
FIG. 15 is a front view of the driven-side coupling of the coupling device of FIG. 13.

The driven-side coupling 51 includes a driven-side base 51a serving as a second base formed in a tubular shape having one open end, and a plurality of driven claws 51b serving as the second claws, which are aligned on an inner peripheral surface of the driven-side base 51a and integrally formed with the driven-side base 51a. Three driven claws 51b are provided, as shown in FIG. 15, and disposed at each of three positions of an evenly divided circumference of the driven-side base 51a, respectively. At the tip portion of the driven claws 51b, slant faces 51c are formed. Tips 51d of a plurality of the driven claws 51b are linearly extended to the shaft center. Furthermore, the tips 51d of the plurality of the driven claws 51b are all located at the same position in the direction of the shaft center of the driven-side coupling 51. The positions of all the tips 51d shown in FIG. 13 correspond to the positions of a tip 51e of the driven-side base 51a.

As shown in FIG. 11, when the driven-side coupling 51 and the drive-side coupling 52 are connected, one end of the cylindrical drive-side base 52a enters inside the tubular driven-side base 51a having one open end so that the driving claws 52b and the driven claws 51b are meshed with each other.

Next, a description will be given of a connection of the driven-side coupling 51 and the drive-side coupling 52. First, when the fixing apparatus 21 is mounted in the printer main body, the shaft 23 of the fixing roller 21 is inserted into the hole 29a on the rear plate 29 so as to determine the position of the fixing apparatus 21. Next, in order to connect the driven-side coupling 51 to the drive-side coupling 52, the fixing apparatus 21 is slid toward the back thereof. The driven-side coupling 51 is shifted in B direction indicated by an arrow in FIG. 13 with respect to the drive-side coupling 52. In a case where the slant faces 51c of the driven claws 51b come into contact with the tips 52c of the driving claws 52b at this time, first, one of the tips 52c of the driving claws 52b, which is more protruded than other driving claws 52b, comes into contact with only one of the slant faces 51c of the driven claws 51b. In this case, since one of the tips 52c of the driving claws 52b initially comes into contact with one of the slant faces 51c of the driven claws 51b, pressure force in which the driven-side coupling is pushed against the driving shaft side is concentrated in the protruded tip 52c of the driving claw 52b.

Accordingly, with a little pressure force, at least either the drive-side coupling 52 or the driven-side coupling 51 rotates. The tip 52c of the driving claw 52b is guided between the driven claws 51b, relatively moving on the slant faces 51c of the driven claws 51b. Assuming that when the driven-side coupling 51 is connected to the drive-side coupling 52, a plurality of the tips 52c of the driving claws 52b come into contact with a plurality of the slant faces 51c of the driven claws 51b all at the same time, the pressure force is dispersed across the plurality of driving claws 52b. Consequently, unless the driven-side coupling 51 is strenuously pressed, at least either the drive-side coupling 52 or the driven-side coupling 51 will not rotate, and the tips 52c of the driving claws 52b cannot relatively move on the slant faces 51c of the driven claws 51b. As a result, it is difficult to connect the driven-side coupling 51 and the drive-side coupling 52. In the coupling device of this exemplary embodiment, when connecting, one driving claw 52b is connected to one driven claw 51b so that the driven-side coupling 51 and the drive-side coupling 52 are easily connected when compared with a coupling device in which a plurality of driving claws 52b and a plurality of the driven claws 51b come into contact all at the same time,.

Furthermore, since the tip portion of the driving claws 52b is in a semispherical shape having pointed tips 52c, one of the tips 52c of the driving claws 52b point-contacts one of the slant faces 5c of the driven claws 51b. As a result, friction between the driving claws 52b and the slant faces 51c of the driven claws 51b is reduced, making it possible to connect the driven-side coupling 51 to the drive-side coupling 52 with less pressure force.

In addition, in a case where the tips 52c of the driving claws 52b come into contact with the slant faces 51c of the driven claws 51b when connecting the drive-side coupling 52 and the driven-side coupling 51, either the drive-side coupling 52 or the driven-side coupling 51 rotates. When the drive-side coupling 52 rotates, rotational load is generated due to inertial forces of the timing belt 63e, each gear 62a and 63b, and so forth. Consequently, in order to rotate the drive-side coupling 52, it is necessary to strenuously press the driven-side coupling 51. Furthermore, when connecting the drive-side coupling 52 and the driven-side coupling 51, in a case where the driven-side coupling 51 is rotated, rotational load is generated due to inertial forces of the fixing roller 21a and so forth. Therefore, in a case where the driven-side coupling 51 is rotated when connecting the drive-side coupling 52 and the driven-side coupling 51, the driven-side coupling 51 will not rotate, unless the driven-side coupling 51 is strenuously pressed further back of the apparatus.

Consequently, as shown in FIG. 11, an electromagnetic clutch 65 is provided between the driving shaft 64 and the driven pulley 63d. When the driving force of the drive motor 62 is transmitted to the fixing roller 21a, the electromagnetic clutch 65 is turned on so as to connect the driving shaft 64 and the driven pulley 63d. On the other hand, when connecting the driven-side coupling 51 and the drive-side coupling 52, the electromagnetic clutch is turned off so that the driving shaft 64 can freely rotate with respect to the driven pulley 63d. Accordingly, when connecting the driven-side coupling 51 and the drive-side coupling 52, the only rotational load on the drive-side coupling 52 will be the inertial force of the driving shaft 64. Therefore, when compared with a case in which no electromagnetic clutch 65 is provided, the rotational load can be reduced. As a result, when connecting, without strenuously pressing the driven-side coupling 51, the drive-side coupling 52 rotates, making it possible to connect the driven-side coupling 51 to the drive-side coupling 52.

Instead of the electromagnetic clutch 65, a one-way clutch may be provided between the driving shaft 64 and the driven pulley 63d to reduce the rotational load of the drive-side coupling 52. In this case, the rotation direction of the driving shaft 64, when the drive-side coupling 52 and the driven-side coupling 51 are connected, is set to be different from the rotation direction of the driving shaft 64 when the driving force of drive motor 62 is transmitted to the fixing roller 21a. Specifically, by the inclination direction of the inclination plates 51c of the driven claws 51b, the rotation direction of the drive-side coupling 52 when connecting the drive-side coupling 52 and the driven-side coupling 51, and the rotation direction of the drive-side coupling 52 when the driving force is transmitted, can be changed. Furthermore, in the rotation direction of the driving shaft 64 when connecting the drive-side coupling 52 and the driven-side coupling 51, the driving shaft 64 is configured to freely rotate with respect to the driven pulley 63d. In the rotation direction of the driving shaft 64 when being driven, the one-way clutch is set such that the driven pulley 63d and the driving shaft 64 rotate together. Accordingly, when the driven-side coupling 51 and the drive-side coupling 52 are connected, the rotational load on the drive-side coupling 52 is reduced. Without strenuously pressing the driven-side coupling 51, the drive-side coupling 52 rotates, making it possible to connect the driven-side coupling 51 to the drive-side coupling 52.

As described above, when the fixing unit 21 is mounted in the printer main body, the shaft 23 of the fixing roller 21a is inserted into the hole 29a of the rear plate 29 so as to determine the position of the fixing unit 21. Subsequently the driven-side coupling 51 and the drive-side coupling 52 are connected. Consequently, due to accumulation of the dimensional tolerance of the hole 29a and the like, when connecting the driven-side coupling 51 to the drive-side coupling 52, there is a possibility that the shaft center of the driven-side coupling 51 does not align with the shaft center of drive-side coupling 52. However, in this exemplary embodiment, the tip portion of the driving claws 52b is in a semispherical shape having pointed tips 52c. Consequently, even in a state where there is a misalignment between the shaft center of the driven-side coupling 51 and the shaft center of the drive-side coupling 52 when connecting the driven-side coupling 51 and the drive-side coupling 52, the tips 52c of the driving claws 52b are guided to the slant faces 51c of the driven claws 51b, thereby connecting the driven-side coupling 51 to the drive-side coupling 52. In other words, since the tip portion of the driving claws 52b is in a semispherical shape forming pointed tips 52c, the tips 52c of the driving claws 52b do not cross the linear tips 51d of the driven claws 51b. As a result, even if there is a misalignment between the shaft center of the driven-side coupling 51 and the shaft center of the drive-side coupling 52, the driven-side coupling 51 can be pressed to the drive-side, so that it is ensured that the driven-side coupling 51 is connected to the drive-side coupling 52.

Figure 16:
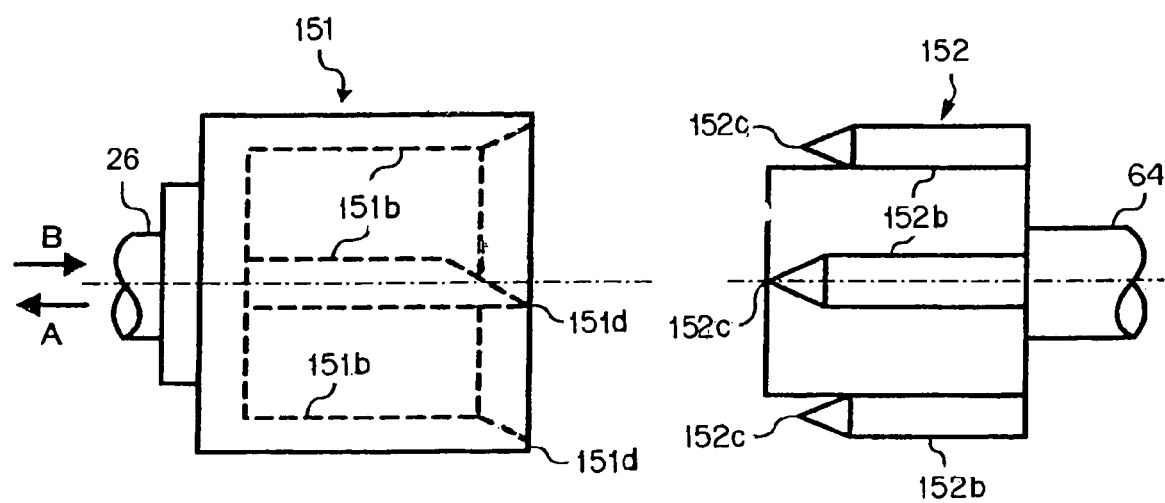
FIG. 16 is a schematic diagram of one example variation of the coupling device of FIG. 13.

As described above, to avoid crossing of the tips 52c of the driving claws 52b and the tips 51d of the driven claws 51b, either the tips 52c of the driving claws 52b or the tips 51d of the driven claws 51b may be pointed. Therefore, as shown in FIG. 16, the tip portion of the driving claws 152b may be configured to be conically shaped, or, though it is not shown, may be configured to be triangular pyramid or quadrangular pyramid in shape. By configuring the tip portion of the driving claws 152b to be conically shaped, such as a circular cone, it is possible to form the tips 152c of the driving claws 152b to be pointed. Thus, even if there is a misalignment between the shaft center of the driven-side coupling 151 and the shaft center of the drive-side coupling 152, the tips 151d of the driven claws 151*b* and the tips 152*c* of the driving claws 152*b* will not cross, so that the driven-side coupling 151 can be connected to the drive-side coupling 152.

Figure 17:
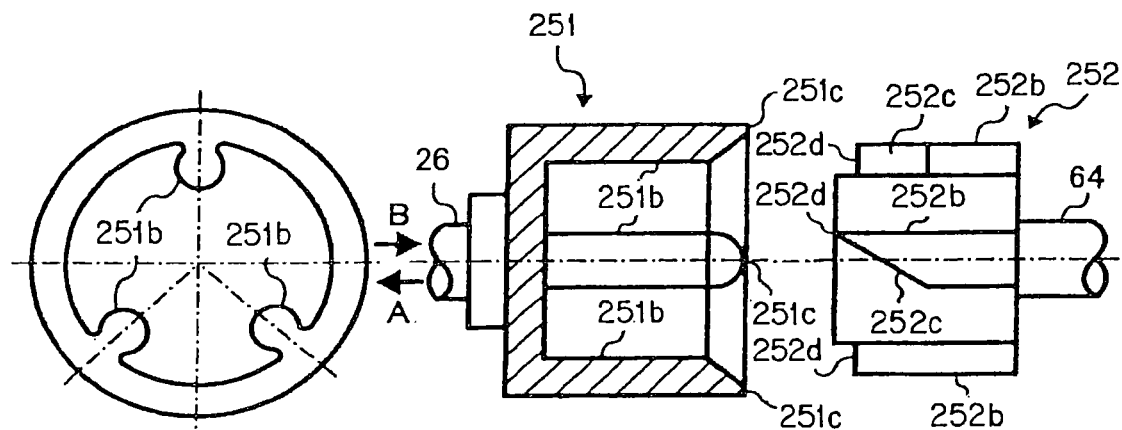
FIG. 17 is a schematic diagram of another example variation of the coupling device of FIG. 13.
Figure 18:
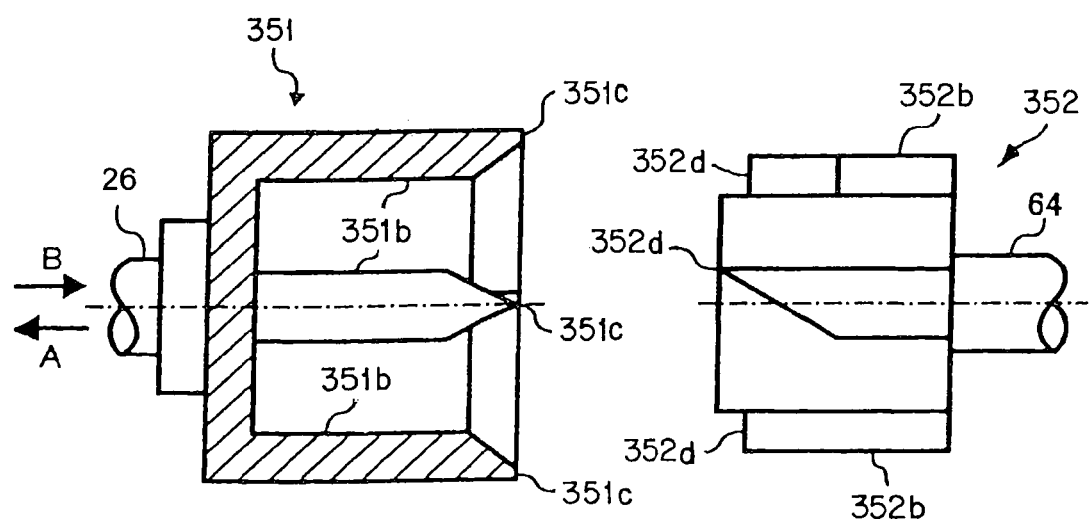
FIG. 18 is a schematic diagram of another example variation of the coupling device of FIG. 13.
Figure 19:
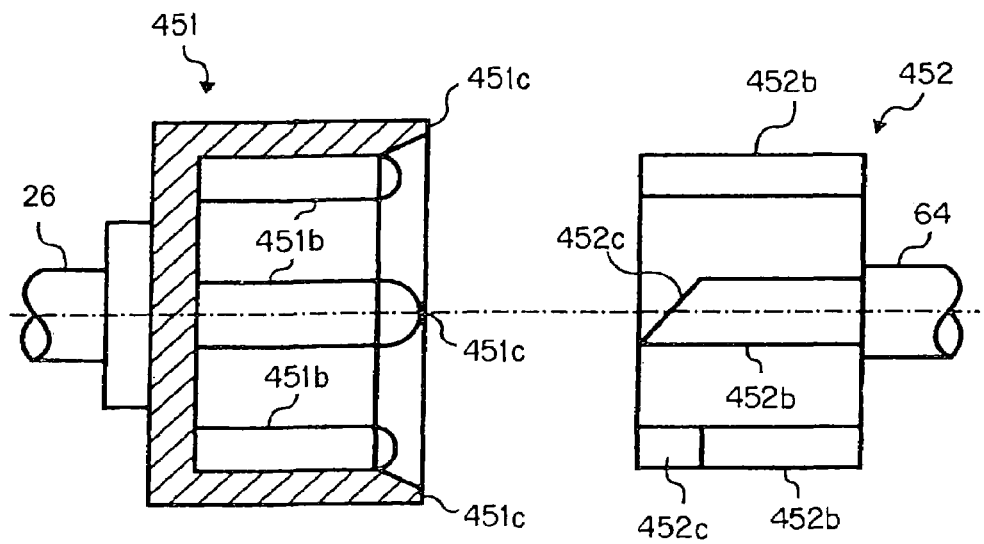
FIG. 19 is a schematic diagram of another example variation of the coupling device of FIG. 13.

Alternatively, as shown in FIG. 17, drive-side coupling 252 including slant faces 252*c* may be provided on the driving claws 252*b*, and the tip portion of the driven claws 251*b* is configured to be semispherical. As shown in FIG. 18, it is also possible to configure the tip portion of the driven claws 351*b* of drive-side coupling 351 to be conically shaped, such as a circular cone, forming the tips 351*c* of the driven claws 351*b* to be pointed. In this case, the tips 352*d* of the driving claws 352*b* of the drive-side coupling 352 need to be aligned with the tip of the drive-side base. In the coupling device shown in FIG. 17, since the tips 251*c* of the driven claws 251*b* are pointed, even if there is a misalignment between the shaft center of the driven-side coupling 251 and the shaft center of the drive-side coupling 252, the tips 251*c* of the driven claws 251*b* and the tips 252*d* of the driving claws 252*b* will not cross. In addition, as shown in FIG. 19, one of the plurality of the tips 451*c* of the driven claws 451*b* of the driven-side coupling 451 may be disposed at a position more adjacent to the tips 451*e* of the driven-side base than the tips 451*c* of other driven claws 451*b*. Since one of the tips 451*c* of the driven claws 451*b* is more protruded toward the drive-side coupling 452 than the tips 451*c* of other driven claws 451*b*, when connecting the drive-side coupling 452 and the driven-side coupling 451, the protruded driven claw 451*b* among other driven claws 451*b* first comes into contact with one of the slant faces 452*c* of the driving claws 452*b*. Consequently, pressure force in which the driven-side coupling 451 is depressed against the driving shaft side is concentrated in the tip 451*c* of the protruded driven claw 451*b* so that with a little pressure force the drive-side coupling 452 and the driven-side coupling 451 can be connected.

Figure 20:
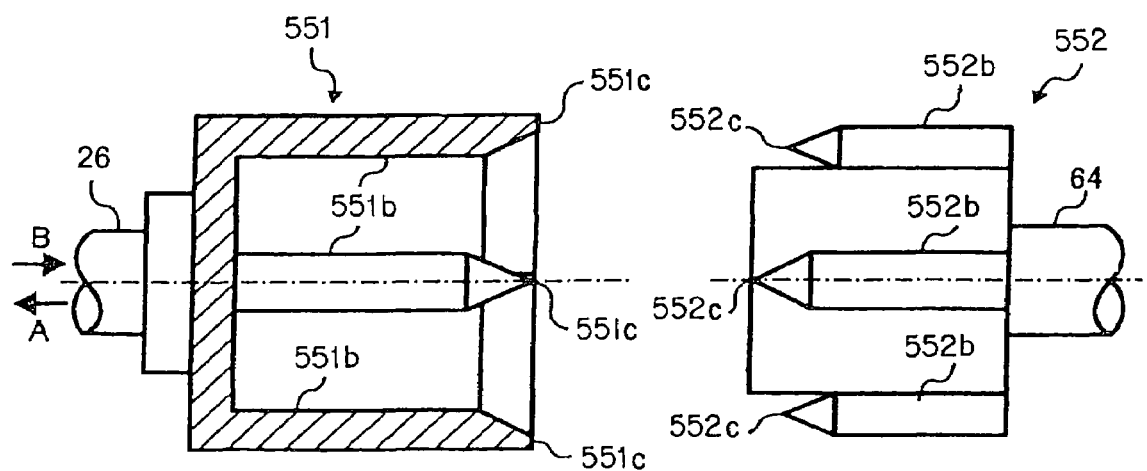
FIG. 20 is a schematic diagram of another example variation of the coupling device of FIG. 13.

As shown in FIG. 20, both the tip portion of the driving claws 552*b* of drive-side coupling 552 and the tip portion of the driven claws 551*b* of driven side coupling 551 may be conically shaped, forming the tips 552*c* of the driving claws 552*b* and the tips 551*c* of the driven claws 551*b* to be pointed. In this manner, since tips of both the driving claws 552*b* and the driven claws 551*b* are pointed, even if there is a misalignment between the shaft centers, the tips 552*c* of the driving claws 552*b* and the tips 551*c* of the driven claws 551*b* will not cross.

Figure 21:
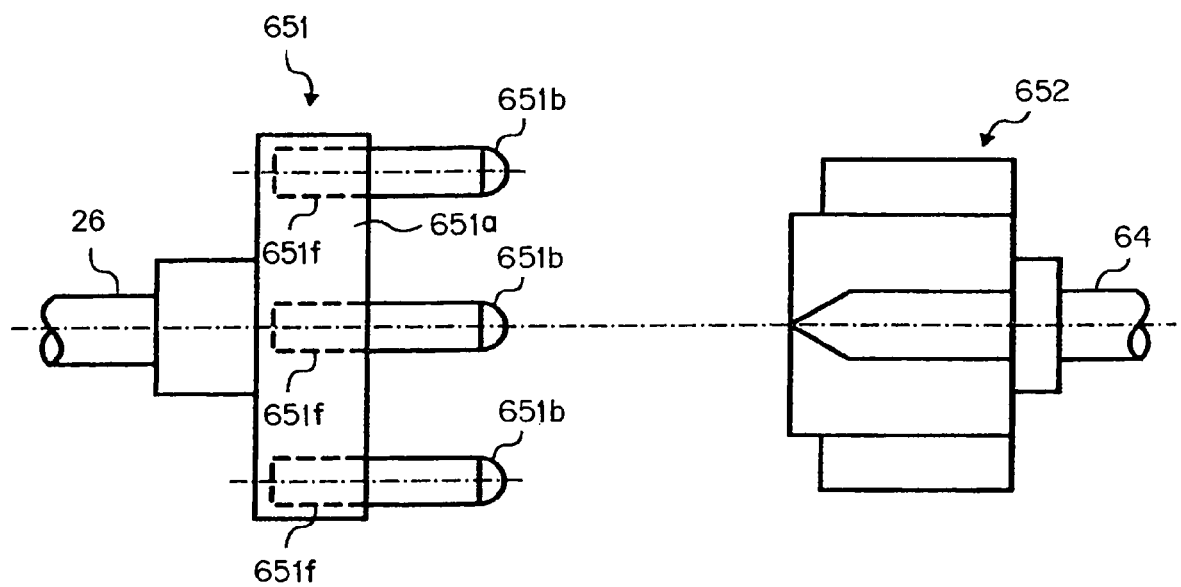
FIG. 21 is a schematic diagram of another example variation of the coupling device of FIG. 13.
Figure 22:
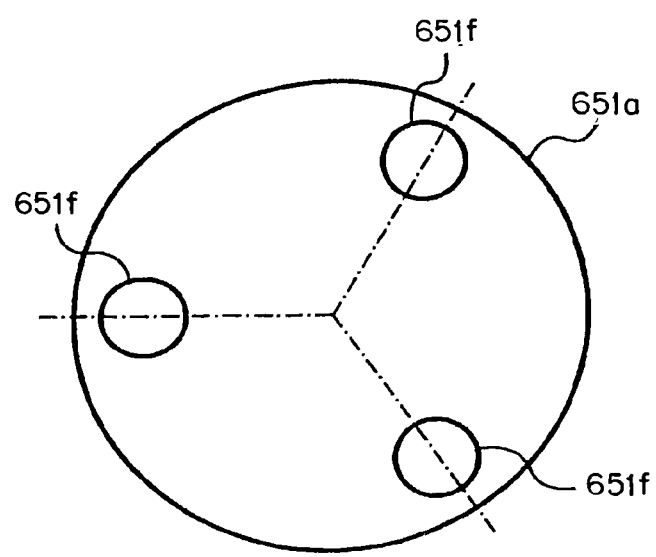
FIG. 22 is a schematic diagram of a driven-side base of the example variation of FIG. 21, seen from a drive-side.
Figure 23:
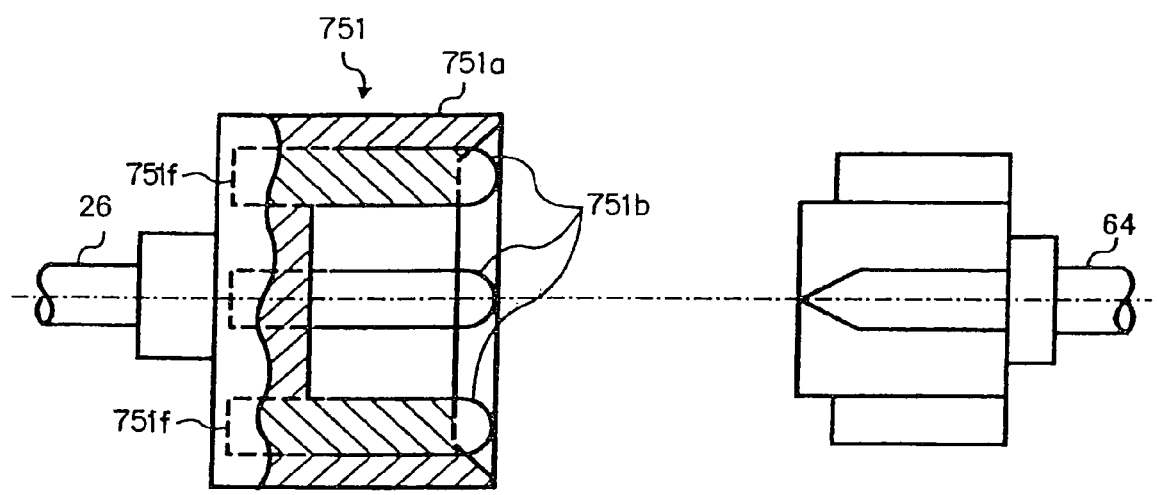
FIG. 23 is a schematic diagram of another example variation of the coupling device of FIG. 13.
Figure 24:
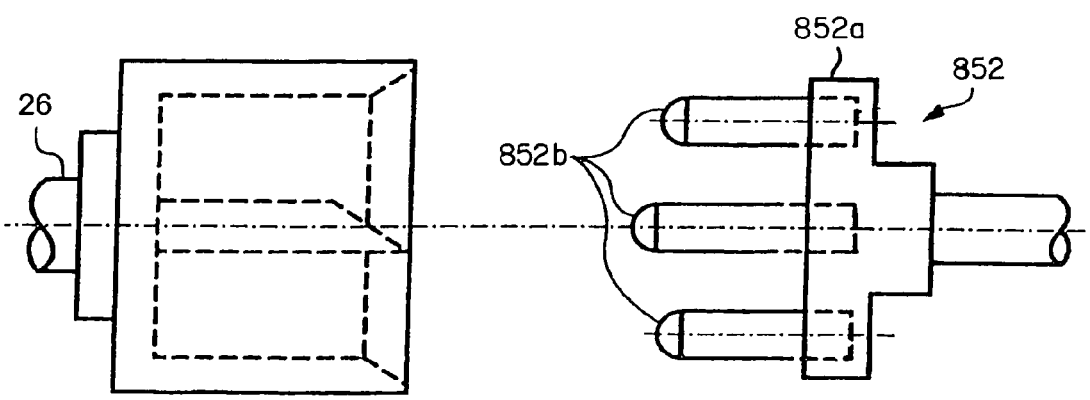
FIG. 24 is a schematic diagram of another example variation of the coupling device of FIG. 13.

As shown in FIG. 21, the driven-side base 651*a* of the driven-side coupling 651 and the driven claws 651*b* may be separate members. In this case, as shown in FIG. 22, holes 651*f* are formed at three places in a circle on the side surface of the cylindrical driven-side base 651*a* toward the drive-side coupling 652. The driven claws 651*b* are pressed into the holes 651*f*, integrating the driven-side base 651*a* with the driven claws 651*b*. Alternatively, as shown in FIG. 23, the holes 751*f* of driven-side coupling 751 are formed on the bottom surface of the cylindrical driven-side base 751*a*, and the driven claws 751*b* are pressed into the holes 751*f*. Furthermore, as shown in FIG. 24, the drive-side base 852*a* of drive-side coupling 852 and the driving claws 852*b* may be separate members.

Figure 9:
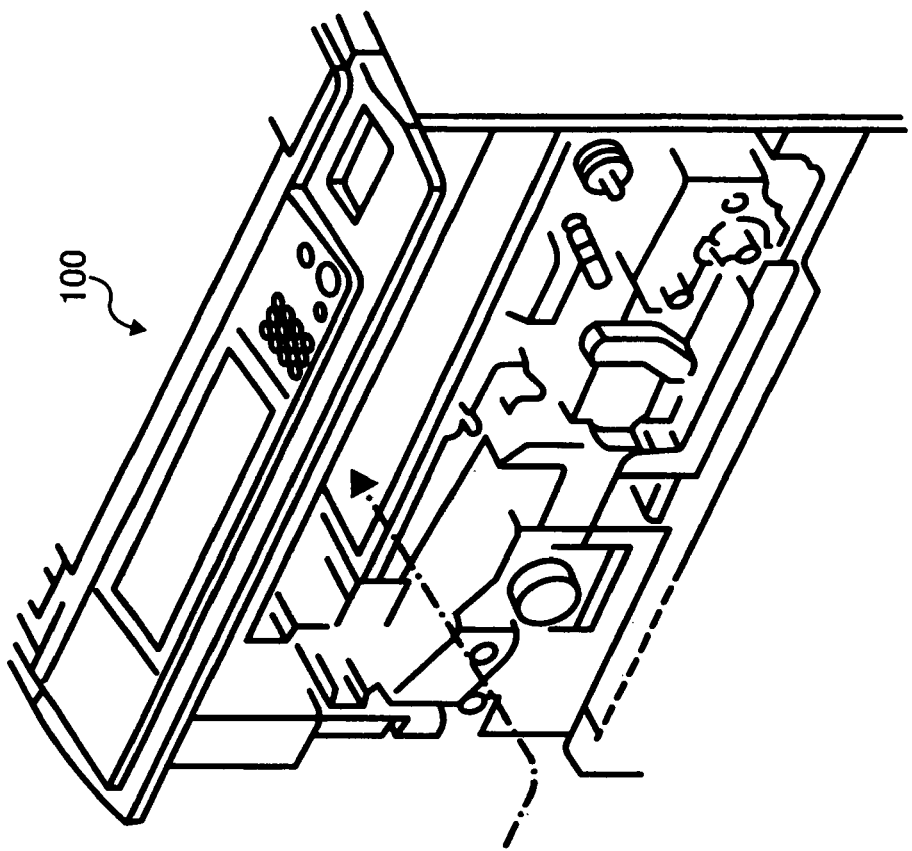
FIG. 9 is a schematic diagram illustrating a manner in which the process unit of FIG. 8 is mounted in the laser printer of FIG. 7.
Figure 9:
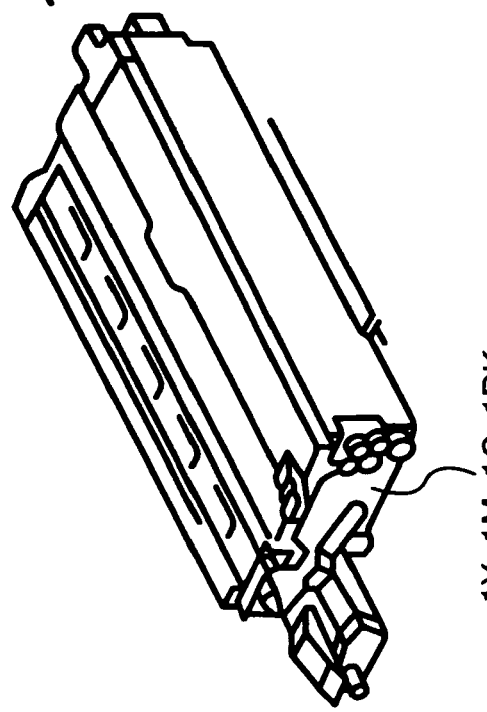

In this exemplary embodiment, a coupling device of the present invention is used to connect the fixing unit 21 and the driving apparatus 60. However, the present invention is not limited specifically to this exemplary embodiment. For example, the coupling device of an exemplary embodiment of the present invention may be used to connect a developing unit including a developing roller and a driving apparatus for rotating the developing roller. Furthermore, the coupling device of an exemplary embodiment of the present invention may be used to connect a photoconductor and a driving apparatus for driving the photoconductor. As previously illustrated in FIG. 9, the coupling device of an exemplary embodiment of the present invention may also be used to connect the process units 1Y, M, C and BK, and the photoconductor or the developing unit in the process units. In addition, the coupling device of an exemplary embodiment of the present invention may be used not only in an image forming apparatus, but also other types of devices and apparatus.

As described above, the drive-side coupling 52 and the driven-side coupling 51 of the coupling apparatus 50 generally are a pair of cylindrically-shaped inner coupler and outer coupler. It may also be possible to form the drive-side coupling 52 as an inner coupler, and the driven-side coupling 51 as an outer coupler and vice-versa.

According to the coupling device of an exemplary embodiment, at least either the driving claws serving as the first claws or the driven claws serving as the second claws are pointed in shape. Thus, when connecting the driven-side coupling which is the second coupling and the driving coupling which is the first coupling, it prevents the tips of the driven claws from colliding with the tips of the driving claws so that the driven-side coupling and the driving coupling will not be connected.

According to the coupling device of an exemplary embodiment, at least either the tip portion of the above-described driving claws or the tip portion of the above-described driven claws is in a semispherical shape. Therefore, the tips thereof can be formed to be pointed.

Furthermore, at least either the tip portion of the above-described driving claws or the tip portion of the above-described driven claws is conically shaped. Therefore, the tips thereof can be formed to be pointed.

According to the coupling device of an exemplary embodiment, since the tips of the driving claws are pointed, even if there is a misalignment between the shaft center of the driven-side coupling and the shaft center of the drive-side coupling, the tips of the driving claws and the tips of the driven claws will not cross. As a result, when connecting the driven-side coupling and the drive-side coupling, the tips of the driven claws are prevented from colliding with the tips of the driving claws so that the driven-side coupling and the driving coupling will not be connected.

Furthermore, when the tips of the driven-claws are formed to be pointed, even if there is a misalignment between the shaft center of the driven-side coupling and the shaft center of the drive-side coupling, the tips of the driving claws and the tips of the driven claws will not cross. As a result, when connecting the driven-side coupling and the drive-side coupling, the tips of the driven claws are prevented from colliding with the tips of the driving claws so that the driven-side coupling and the driving coupling will not be connected.

Furthermore, when both tips of the driven claws and the driving claws are formed to be pointed, even if there is a misalignment between the shaft center of the driven-side coupling and the shaft center of the drive-side coupling, the tips of the driving claws and the tips of the driven claws will not cross. As a result, when connecting the driven-side coupling and the drive-side coupling, the tips of the driven claws are prevented from colliding with the tips of the driving claws so that the driven-side coupling and the driving coupling will not be connected.

According to the coupling device of an exemplary embodiment, slant faces are formed on the tip portion of either the driving claws or the driven claws of which tips are not pointed. Therefore, when the driven-side coupling is pressed into the drive-side coupling in the shaft direction thereof so that the driven-side coupling is connected to the drive-side coupling, at least either the driven-side coupling or the drive-side coupling rotates. Accordingly, when connecting, even if the driven claws and the driving claws come into contact, the tips of either the driven claws or the driving claws slide along the slant faces of the other claws, so that each drive claw may be inserted into each driving claw. As a result, the driving claws and the driven claws are meshed with one another, and the driven-side coupling and the drive-side coupling are connected.

According to the coupling device of an exemplary embodiment, the position of each driven claw with respect to the driven-side base and the position of each driving claw with respect to the drive-side base are set such that one of the driven claws first comes into contact with one of the driving claws in a case where the driven claws and the driving claws come into contact when connecting the driven-side coupling to the drive-side coupling. When connecting, since only one of driven claws comes into contact with one of driving claws, pressure force is concentrated in this single driven claw and this single driving claw. Accordingly, without strenuously pressing the driven-side coupling to the drive-side coupling, either the driven-side coupling or the drive-side coupling can be rotated. As a result, the driven-side coupling and the drive-side coupling are easily connected.

According to the coupling device of an exemplary embodiment, one of the tips of the driving claws of the drive-side coupling is disposed at a position more adjacent to the tip of the drive-side base, than the tips of other driving claws. Accordingly, in a case where the driven claws and the driving claws come into contact when connecting the driven-side coupling to the drive-side coupling, one of the driven claws and one of the driving claws first come into contact.

Furthermore, even if one of the tips of the driven claws of the driven-side coupling may be disposed at a position more adjacent to the tip of the driven-side base, than the tips of other driven claws, one of the driven claws and one of the driving claws first come into contact in a case where the driven claws and the driving claws come into contact when connecting the driven-side coupling to the drive-side coupling.

According to the image forming apparatus of an exemplary embodiment, since the above-described coupling device is provided, the rotating shaft of the driven unit is easily connected to the driving shaft of the driving unit.

According to the image forming apparatus of an exemplary embodiment, the driven coupling is provided to the driven shaft, which is a rotating shaft of an attachable/detachable unit, and the driving coupling is provided to the driving shaft, which is a rotating shaft of the apparatus main body. Consequently, a problem, in which the driven coupling and the driving coupling are not connected when the unit is mounted so that the unit fails to be mounted in the apparatus main body, may be prevented.

Exemplary embodiments of this invention may be conveniently implemented using a general purpose digital computer programmed according to the teachings of the present specification. Appropriate software coding can readily be prepared by programmers based on the teachings of the present disclosure. Exemplary embodiments of the present invention may also be implemented by the preparation of application specific integrated circuits or by interconnecting an appropriate network of component circuits.

Numerous additional modifications and variations are possible in light of the above teachings. It is therefore to be understood that the disclosure of this patent specification may be practiced otherwise than as specifically described herein.

The invention claimed is:

1. An image forming apparatus, comprising:
a driving source;
a rotary element; and
a coupling device configured to connect the driving source with the rotary element, the coupling device including,
an inner coupling having a first rotating shaft, a first base mounted to one end of the first rotating shaft, and a first group of claws disposed at evenly spaced intervals in a circumferential direction, and
an outer coupling having a second rotating shaft, a second base mounted to one end of the second rotating shaft, and a second group of claws disposed at evenly spaced intervals in the circumferential direction and configured to alternately mesh with the first group of claws in the circumferential direction when the outer coupling is moved towards the inner coupling in an axial direction, such that the second group of claws face the first group of claws and that a second axis of the outer coupling is approximately in line with a first axis of the inner coupling,
wherein each claw in the first group of claws includes a first claw body portion that directly contacts the first base in a radial direction with respect to the first claw along an entire length of the first claw body portion in the axial direction,
wherein each claw in the second group of claws includes a second claw body portion that directly contacts the second base in a radial direction with respect to the second claw along an entire length of the second claw body portion in the axial direction,
wherein each claw in at least one of the first and second groups of claws includes a pointed tip portion including a beginning portion and an end portion, such that the pointed tip portion extends in the axial direction from the respective one of the first and second claw body portions at the beginning portion to the end portion, and does not directly contact the respective first or second base in the radial direction of the respective one of the first and second claw, and
wherein the end portion is further from the respective first and second base than the beginning portion.

2. The image forming apparatus of claim 1, wherein one of the inner and outer couplings is connected to the driving source and the other one of the inner and outer couplings is connected to the rotary element to be driven by power of the driving source through the inner and outer couplings.

3. The image forming apparatus of claim 1, wherein the tip portions include semispherical tips.

4. The image forming apparatus of claim 1, wherein the tip portions include conical tips.

5. The image forming apparatus of claim 1, wherein one of the first and second groups of claws includes slant-top-surface claws having a slant top surface which faces the at least one of the first and second groups of claws including claws including the pointed tip portions, and the pointed tip portions slide along the slant top surface of the slant-top-surface claws when the pointed tip portions collide with the slant-top-surface claws and the outer coupling is further moved towards the inner coupling along in the axial direction so that one of the inner and outer couplings is rotated until the first and second groups of claws are engaged with each other.

6. The image forming apparatus of claim 5, wherein the at least one of the first and second groups of claws including claws including the pointed tip portions are arranged at positions different in the axial direction and the slant-top-surface claws are correspondingly arranged at positions in the axial direction so that collisions of facing pairs of the first group of claws and the second group of claws sequentially occur.

7. The image forming apparatus of claim 1 wherein the at least one of the first and second groups of claws including claws including the pointed tip portions further includes a protruding claw, wherein the protruding claw extends further in the axial direction from the respective one end of the first and second rotating shaft than remaining claws of the at least one of the first and second groups of claws including claws including the pointed tips.

8. The image forming apparatus of claim 1, wherein the first group of claws are comprised of separate first claws which are separately arranged in the first base and wherein the second group of claws are comprised of separate second claws which are separately arranged in the second base.

9. The image forming apparatus of claim 1, wherein such that the pointed tip portions are configured to initially engage reciprocal tips of the first or second group of claws at only one point.

10. A coupling device, comprising:

an inner coupling having a first rotating shaft, a first base mounted to one end of the first rotating shaft, and including a first group of claws disposed at evenly spaced intervals in a circumferential direction, an outer coupling having a second rotating shaft, a second base mounted to one end of the second rotating shaft, and including a second group of claws disposed at evenly spaced intervals in the circumferential direction and configured to alternately mesh with the first group of claws in the circumferential direction when the outer coupling is moved towards the inner coupling in an axial direction such that the second group of claws faces the first group of claws and that a second axis of the outer coupling is approximately in line with a first axis of the inner coupling, wherein each claw in the first group of claws includes a first claw body portion that directly contacts the first base in a radial direction with respect to the first claw along an entire length of the first claw body portion in the axial direction, wherein each claw in the second group of claws includes a second claw body portion that directly contacts the second base in a radial direction with respect to the second claw along an entire length of the second claw body portion in the axial direction, wherein each claw in at least one of the first and second groups of claws includes a pointed tip portion including a beginning portion and an end portion, such that the pointed tip portion extends in the axial direction from the respective one of the first and second claw body portions at the beginning portion to the end portion, and does not directly contact the respective first or second base in the radial direction of the respective one of the first and second claw, and wherein the end portion is further from the respective first and second base than the beginning portion.

11. The coupling device of claim 10, wherein one of the inner and outer couplings is connected to a driving source and the other one of the inner and outer couplings is connected to a rotary element to be driven by power of the driving source through the inner and outer couplings.

12. The coupling device of claim 10, wherein the tip portions include semispherical tips.

13. The coupling device of claim 10, wherein the tip portions include conical tips.

14. The coupling device of claim 10, wherein one of the first and second groups of claws includes slant-top-surface claws having a slant top surface which faces the at least one of the first and second groups of claws including claws including the pointed tip portions, and the pointed tip portions slide along the slant top surface of the slant-top-surface claws when the pointed tip portions collide with the slant-top-surface claws and the outer coupling is further moved towards the inner coupling along in the axial direction so that one of the inner and outer couplings is rotated until the first and second groups of claws are engaged with each other.

15. The coupling device of claim 14, wherein the at least one of the first and second groups of claws including claws having pointed tip portions are arranged at positions different in the axial direction and the slant-top-surface claws are correspondingly arranged at positions in the axial direction so that collisions of facing pairs of the first group of claws and second group of claws sequentially occur.

16. The coupling device of claim 10, wherein the at least one of the first and second groups of claws including claws including the pointed tip portions further includes a protruding claw, wherein the protruding claw extends further in the axial direction from the respective one end of the first and second rotating shaft than remaining claws of the at least one of the first and second groups of claws including claws including the pointed tips.

17. The coupling device of claim 10, wherein the first group of claws are comprised of separate first claws which are separately arranged in the first base and wherein the second group of claws are comprised of separate second claws which are separately arranged in the second base.

18. The coupling device of claim 10, wherein such that the pointed tip portions are configured to initially engage reciprocal tips of the first or second group of claws at only one point.

* * * * *